(12) United States Patent
DiMatteo et al.

(10) Patent No.: US 6,227,703 B1
(45) Date of Patent: May 8, 2001

(54) VARIABLE LENGTH SENSOR PROBE SYSTEM

(75) Inventors: Joseph R. DiMatteo, Billerica; Paul C. Neilson, Andover; Clifford W. Lewis, Wayland, all of MA (US)

(73) Assignee: Adaptive Instruments Corporation, Hudson, MA (US)

( * ) Notice: Subject to any disclaimer, the term of this patent is extended or adjusted under 35 U.S.C. 154(b) by 0 days.

(21) Appl. No.: 09/222,854

(22) Filed: Dec. 30, 1998

(51) Int. Cl.⁷ .............................. G01K 1/14; G01D 11/00
(52) U.S. Cl. ........................................ 374/208; 73/866.5
(58) Field of Search .................... 374/208, 209; 73/866.5

(56) References Cited

U.S. PATENT DOCUMENTS

| 4,159,766 | 7/1979 | Kluge | 374/209 |
|---|---|---|---|
| 4,453,835 | 6/1984 | Clawson et al. | 374/185 |
| 4,588,306 | 5/1986 | Burger et al. | 374/158 |
| 4,626,643 | 12/1986 | Minet | 219/712 |
| 4,826,540 | 5/1989 | Mele | 136/221 |
| 4,876,905 | * 10/1989 | Callsen et al. | 73/866.5 |
| 4,950,085 | 8/1990 | Horvath | 374/207 |
| 4,963,194 | 10/1990 | Mele | 136/221 |
| 5,138,755 | * 8/1992 | Evans et al. | 73/866.5 |
| 5,197,805 | 3/1993 | Wilson | 374/208 |
| 5,325,734 | * 7/1994 | Jordan | 73/866.5 |
| 5,632,557 | 5/1997 | Simons | 374/148 |
| 5,662,418 | 9/1997 | Deak et al. | 374/144 |
| 5,674,009 | 10/1997 | Stark | 374/209 |

FOREIGN PATENT DOCUMENTS

2621120 * 3/1989 (FR) ................... 374/208

* cited by examiner

*Primary Examiner*—Diego Gutierrez
*Assistant Examiner*—Stanley J. Pruchnic, Jr.
(74) *Attorney, Agent, or Firm*—Iandiorio & Teska

(57) ABSTRACT

A variable length sensor probe system for connection to a sensor well includes a housing adapted for connection to the proximate end of a sensor well; a sensor probe having a distal end for contacting the distal end of the sensor well and a proximate end extending into the housing; and an indexing device for interconnecting the housing and the proximate end of the sensor probe for setting the penetration of said sensor probe in the sensor well at one of a number of discrete positions and continuously urging the distal end of the sensor probe against the distal end of the sensor well.

17 Claims, 6 Drawing Sheets

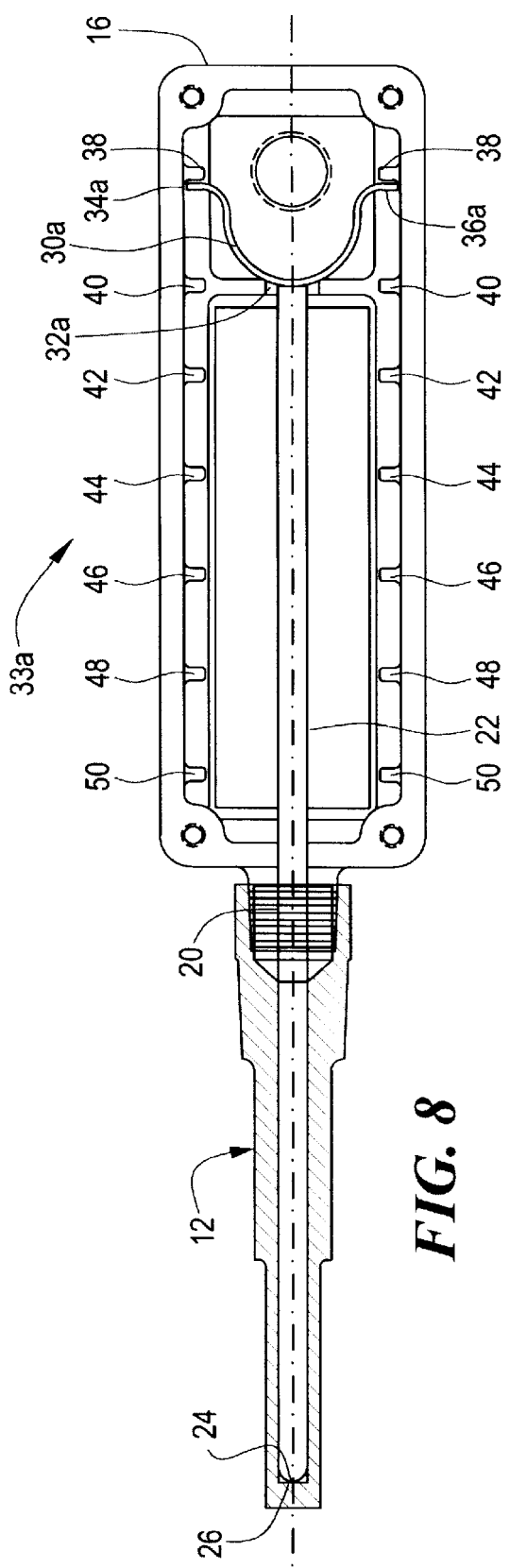
FIG. 8
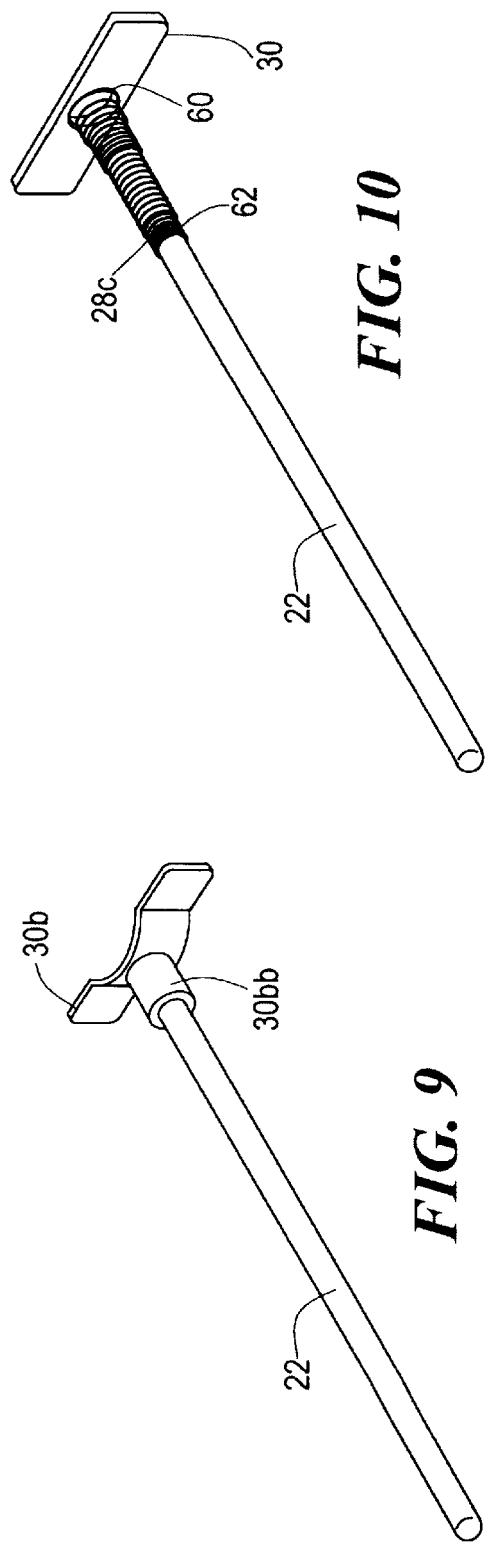
FIG. 10
FIG. 9

VARIABLE LENGTH SENSOR PROBE SYSTEM

FIELD OF INVENTION

This invention relates to a variable length sensor probe system for connection to a sensor well.

BACKGROUND OF INVENTION

Sensor probe systems employing a housing and a sensor probe are commonly used by connecting them to a sensor well for sensing a predetermined parameter, e.g. temperature, pressure, vibration, heat. For example, when the parameter is heat or temperature, the housing and temperature sensor probe are connected to a heat transfer well or thermal well. The sensor probe is typically a hollow tube with one or more temperature sensors at the closed end and wires coming out the open end to connect to signal processing electronics. If multiple sensors are used in a probe they can be grouped for averaging their readings or spaced to obtain temperature gradients, for example. The sensor probe is disposed in the thermal well with the closed distal end of the sensor probe contacting the distal end of the well. The well physically protects the sensor probe and temperature sensors and provides good thermal transfer from the medium whose temperature is to be measured by the sensor probe. Good thermal contact between the distal ends of the well and sensor probe is important for accurate sensing. To ensure good contact, the distal end, or tip, of the sensor probe is pressed against the bottom, or distal end, of the well by a spring or other mechanical force. However, the wells vary in length depending upon the insertion depth required by the particular application. It is therefore necessary to have sensor probes of a number of different lengths: no one length of sensor probe can accommodate all applications and so a number of different sizes must be manufactured and inventoried.

SUMMARY OF INVENTION

It is therefore an object of this invention to provide an improved variable length sensor probe system for connection to a sensor well.

It is a further object of this invention to provide such a variable length sensor probe system which enables a wide range of sensor probe lengths to be used with a particular length well.

It is a further object of this invention to provide such a variable length sensor probe system which can accommodate a wide range of well lengths with a single length sensor probe.

It is a further object of this invention to provide such a variable length sensor probe system which accommodates combining of a wide range of different well lengths and sensor probe lengths while maintaining good contact between the distal ends of the well and sensor probe.

The invention results from the realization that a variable length sensor probe system which permits a single sensor probe to be used with a wide range of well lengths and a wide range of sensor probe lengths to be used with a single well while always urging the distal ends of the sensor probe and well into good intimate contact can be achieved using an indexing device which interconnects and discretely positions the sensor probe and the housing that receives the well to properly position the sensor probe in the well and continuously urges their distal ends into intimate contact throughout the range of positions.

This invention features a variable length sensor probe system for connection to a sensor well including a housing adapted for connection to the proximate end of a sensor well and a sensor probe having a distal end for contacting the distal end of the sensor well and a proximate end extending into the housing. There is an indexing device for interconnecting the housing and the proximate end of the sensor probe for setting the penetration of the sensor probe in the sensor well at one of a number of discrete positions and continuously urging the distal end of the sensor probe against the distal end of the sensor well.

In a preferred embodiment the indexing device may include a bias member. The bias member may engage both the sensor probe and the housing. The indexing device may include a bias member and a mounting element. The bias member may engage the sensor probe and the mounting element may engage the housing, or the bias member may engage the housing and the mounting element may engage the sensor probe. The bias member may be a leaf spring, an elastomer or a coil spring. The indexing device may include a number of aligned steps on the housing. It may also include a stop member for selectively engaging the steps. The sensor probe may include at least one temperature sensing device. The indexing device may include a threaded shaft and a threaded member engaged with the shaft. The threaded member may include a biasing device. The shaft may engage the housing and the threaded member the sensor probe. The biasing device may engage the sensor probe. The indexing device may include a plurality of stops on the sensor probe, a mounting element engaged with the housing, and means for selectively interconnecting one of the stops and the housing.

DISCLOSURE OF PREFERRED EMBODIMENT

Other objects, features and advantages will occur to those skilled in the art from the following description of a preferred embodiment and the accompanying drawings, in which:

FIG. 8 is a top plan view similar to FIG. 2 of another embodiment of the system according to this invention in which the indexing device uses a leaf spring;

FIGS. 9 and 10 are schematic three-dimensional diagrams of alternative biasing members and mounting elements that can be used in the indexing device according to this invention;

Figure 1:
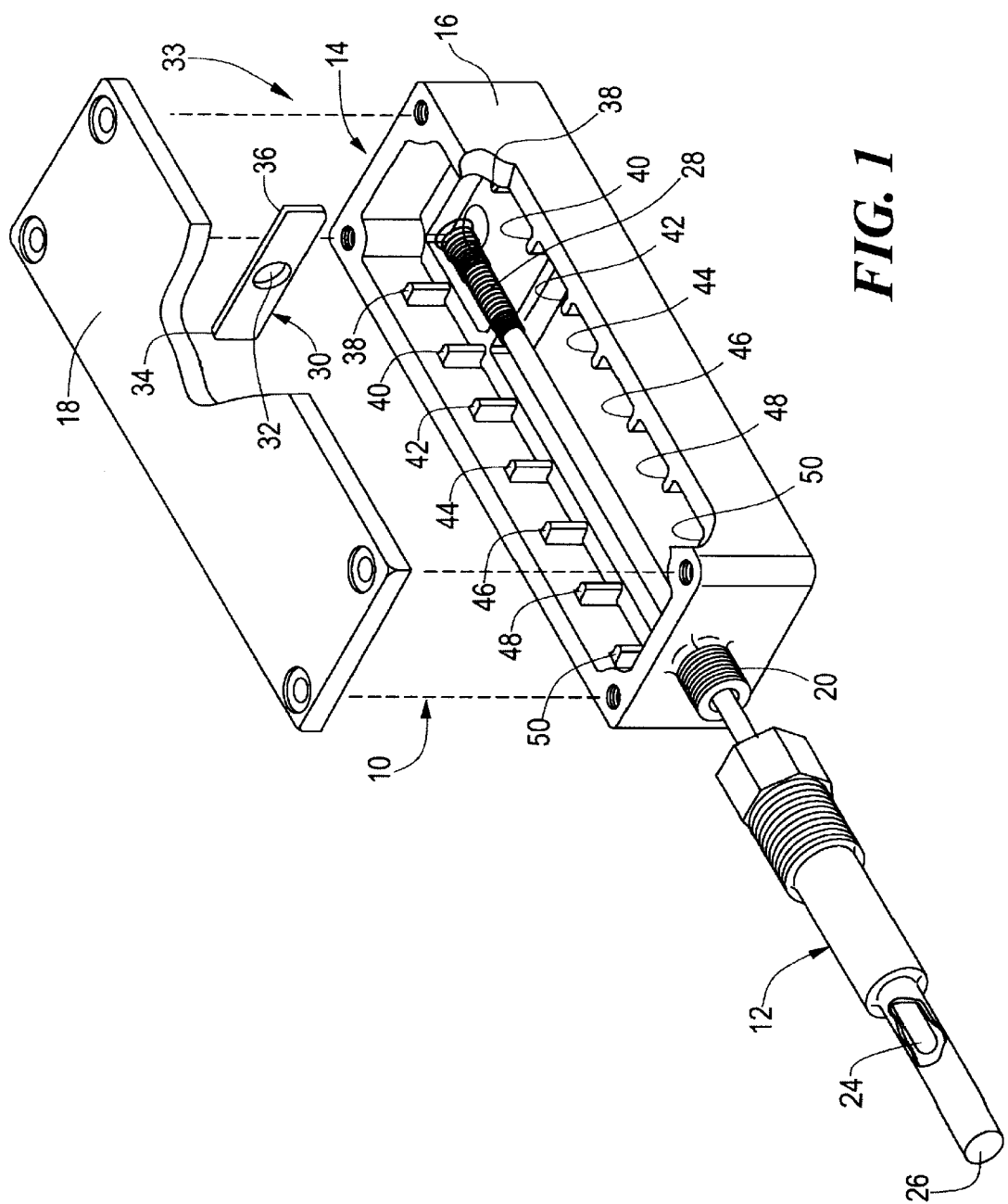
FIG. 1 is an exploded three-dimensional view of a variable length sensor probe system according to this invention and a sensor well.
Figure 2:
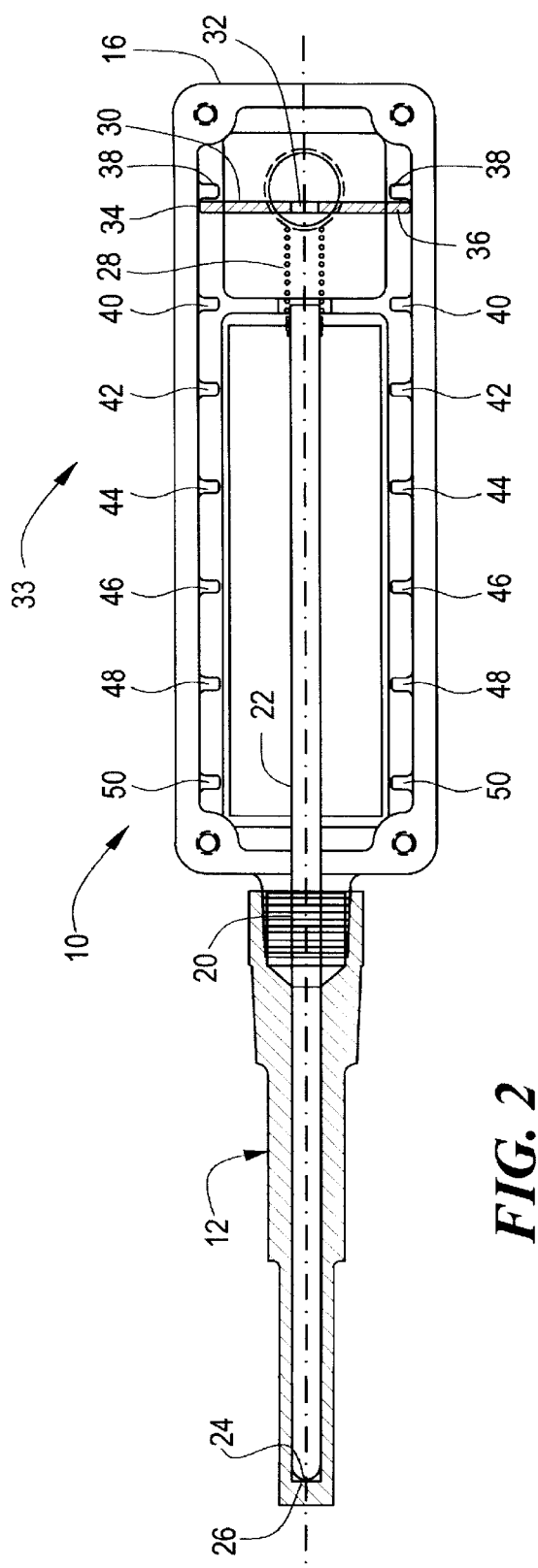
FIG. 2 is a top plan view of the system and well of FIG. 1 with the cover removed.
Figure 3:
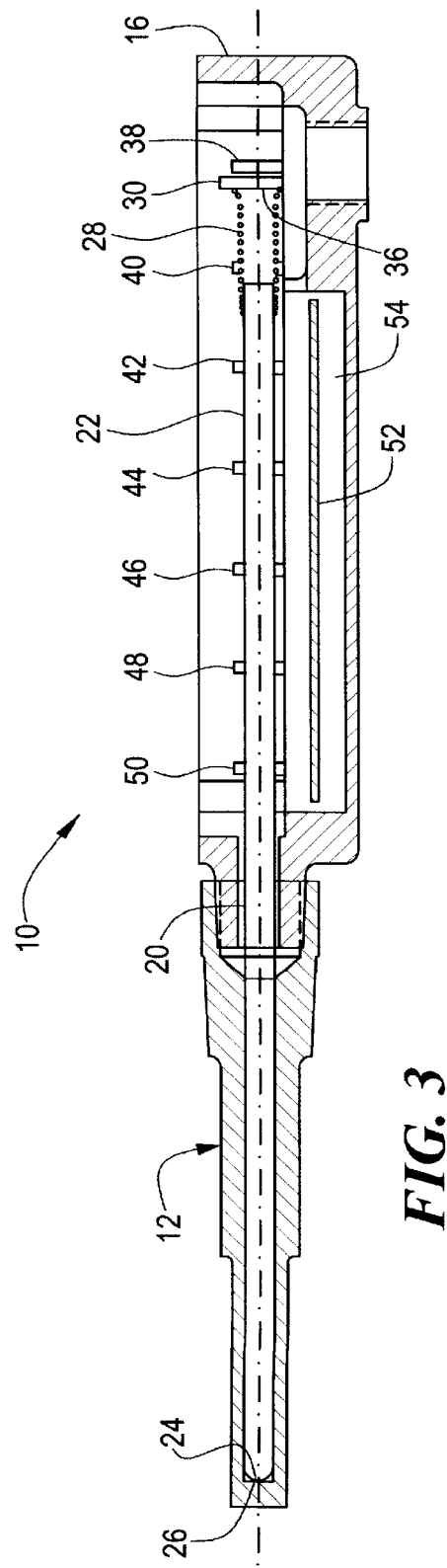
FIG. 3 is a side elevational cross-sectional view of the system of FIG. 1 with the cover removed.

There is shown in FIGS. 1–3 a variable length sensor probe system 10 according to this invention and a sensor well 12. Variable length sensor probe system 10 includes a housing 14 comprising base 16 and cover 18 held in place by four screws, not shown. Sensor well 12 threadably engages with the threaded nipple 20. Variable length sensor probe system 10 also includes a sensor probe 22 whose closed distal end 24 engages with the closed distal end 26 of sensor well 12 when the assembly is complete. The proximate end of sensor probe 22 includes a biasing member, spring 28, which engages with the proximate end of sensor probe 22 and with the mounting member 30 which contains a hole 32 for accommodating the end of sensor probe 22. The outer edges 34 and 36 of mounting element 30 engage opposing pairs of steps 38, 40, 42, 44, 46, 48 and 50. The combination of the steps 38–50, mounting element 30, and spring 28 constitute an indexing device 33 which allows a wide range of different length sensor probes 22 to accommodate a wide range of different length sensor wells 12, while constantly urging the tip 24 of sensor probe 22 into good intimate contact with the tip 26 of sensor well 12. Spring 28 or whatever biasing device is used maintains the intimate contact of the sensor well end and sensor probe end at all positions of steps 38–50 and at positions in between. The steps provide discrete length adjustments. The biasing device provides both the force to hold the sensor end in intimate contact with the well end and fine length adjustment between the discrete steps. Although the steps are shown as salient elements or ribs they could as well be slots. And although shown equally spaced they need not be; they could be unequally spaced.

By positioning mounting element 30 against one of the pairs of steps 38–50, sensor probe 22 can be made to extend more or less beyond nipple 20 and thus to accommodate a variety of different sizes of sensor well 12; or conversely, a number of different length sensor probes 22 may be positioned to accommodate the same sensor well 12. Spring 28, which is narrower at its distal end where it engages sensor probe 22 and of larger diameter at its proximate end where it engages mounting element 30, acts to constantly urge sensor probe 22 so that its distal end 24 is in intimate contact with the distal end 26 of sensor well 12, regardless of what pair of steps 48–50 mounting element 30 has been installed against. This ensures good contact for thermal transfer from the object, not shown, whose temperature is to be sensed through the distal end 24 of sensor probe 22.

Figure 4:
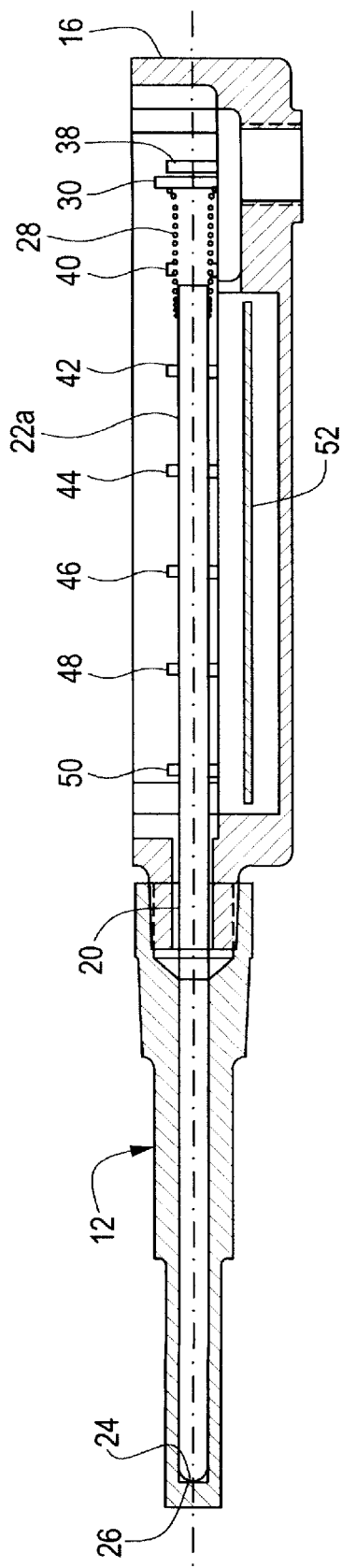
FIGS. 4 and 5 are views similar to FIG. 3 of the variable length sensor probe system according to this invention utilizing two different length sensor probes with the same sensor well.
Figure 5:
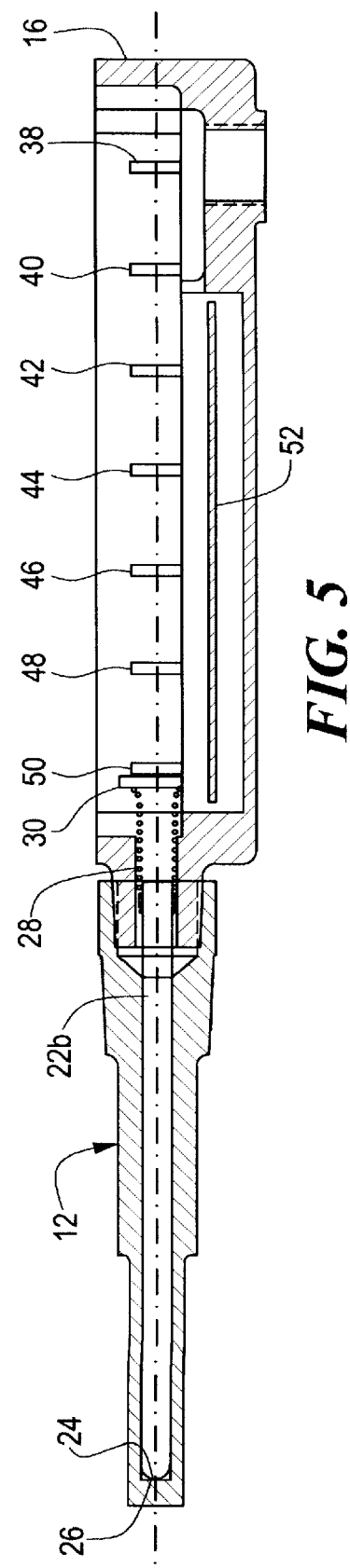
Figure 6:
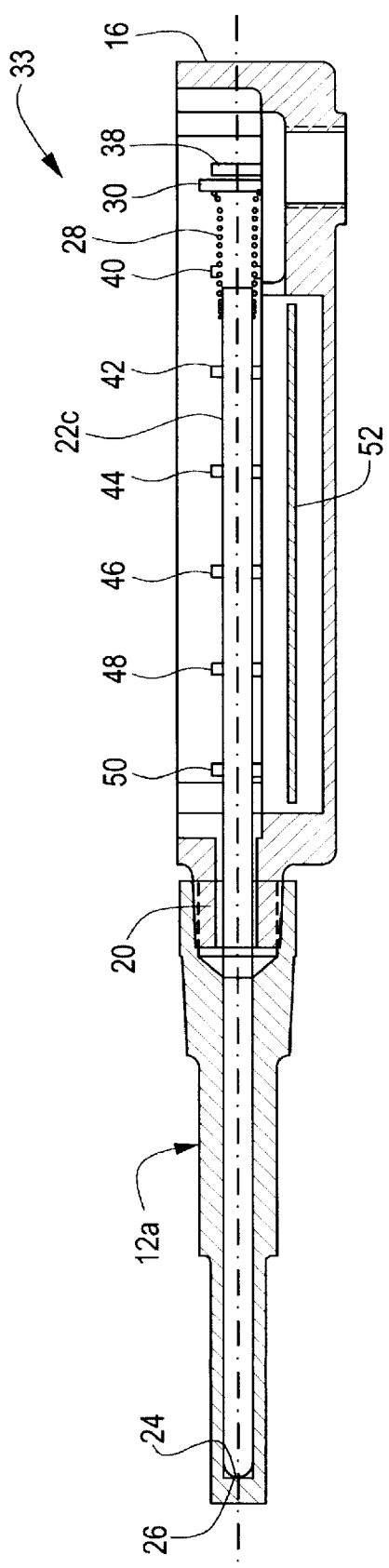
FIGS. 6 and 7 are views similar to FIGS. 4 and 5 showing the use of a single sensor probe with two different length sensor wells.
Figure 7:
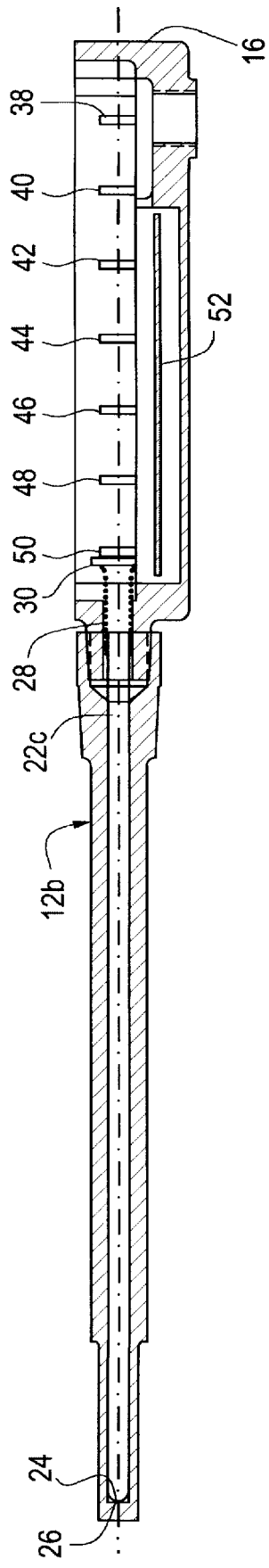
Figure 13:
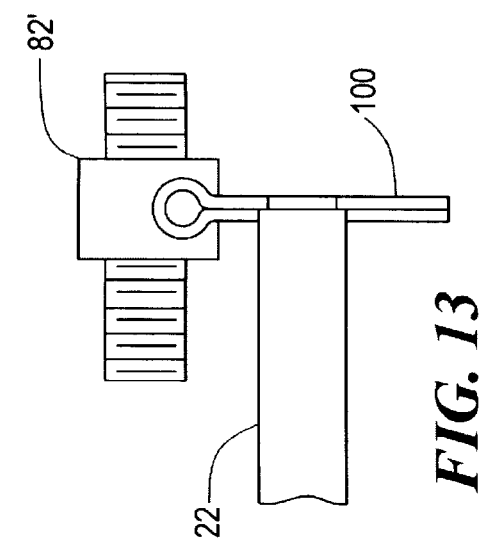
FIG. 13 is an enlarged detailed view of an alternative construction of the indexing device of FIG. 12.

The ability to accommodate a wide range of sensor probe lengths and sensor well lengths with a single housing by virtue of this invention makes it feasible to include in the same housing a printed circuit board or integrated circuit chip 52, FIG. 3, which can house all of at least the preliminary electronic processing circuitry right in housing 16 in a recess 54 provided therefor. The facility of the variable length sensor probe system, according to this invention, for accommodating a wide range of different length sensor probes with a single sensor well is illustrated in FIGS. 4 and 5. In FIG. 4 a long sensor probe 22a is made to accommodate sensor well 12 by placing mounting element 30 at the farthest stops 38 while in FIG. 5 a much shorter sensor probe 22b is made to accommodate the same sensor well of the same length by placing mounting element 30 at the closest stop 50. In the same way, a sensor probe 22c in FIGS. 6 and 7 is made to accommodate two different length wells 12a and 12b by placing mounting element 30 at the farthest steps 38 and the closest steps 50, respectively.

Although thus far, indexing device 33 is shown as including the steps 38–50, mounting element 30 and spring 28, this is not a necessary limitation of the invention as the variable length accommodation and the constant urging force can be accomplished in a number of ways according to this invention. For example, in FIG. 8 the mounting element is replaced by leaf spring 30a which functions both as a mounting element to engage stops 38–50 and as a spring element to provide a force urging sensor probe 22 forward so that its end 24 engages the end 26 of sensor well 12. Mounting element 30a actually performs the function of both the spring 28 and the mounting element 30 of FIGS. 1–3. Alternatively, a leaf spring element 30b, FIG. 9, could include a mounting element 30bb added to leaf spring 30b for the purpose of engaging sensor probe 22 instead of having sensor probe 22 engage directly with leaf spring 30b.

In another alternative mounting element, the spring 28c, FIG. 10, may be made conical in shape so that its larger end 60 is mounted to mounting element 30 and its smaller end 62 grips sensor probe 22.

Figure 11:
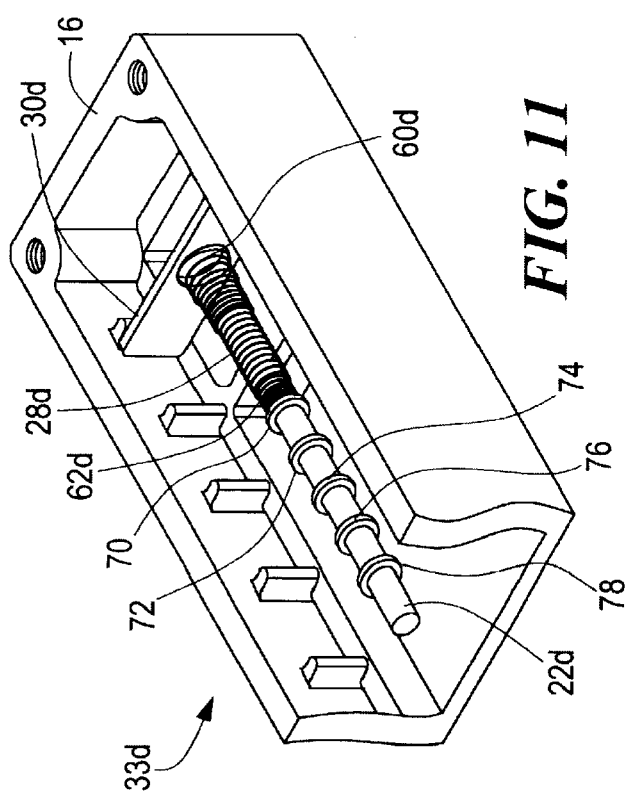
FIG. 11 is a diagrammatic three-dimensional view with portions broken away of yet another indexing device for use with this invention.

In yet another construction, as shown in FIG. 11, sensor probe system 33d mounting element 30d may be fixed to housing 16, and spring 28d may be a cylindrical or conical spring with its base 60d attached to mounting element 30d and its forward end 62d engaging with sensor probe 22d which includes on it a number of stops 70, 72, 74, 76 and 78. The extent of sensor probe 22d may be foreshortened or increased by the choice of the placement of the end 62d of spring 28d with respect to the stops 70–78.

Figure 12:
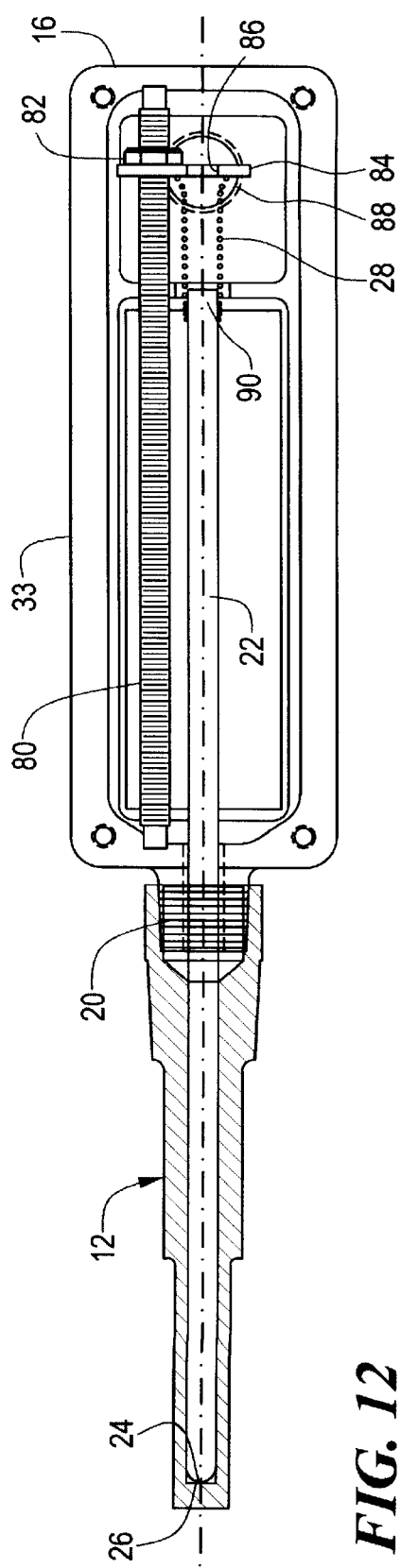
FIG. 12 is a top plan view similar to FIG. 2 of yet another indexing device for use with the variable length sensor probe system according to this invention.

In yet another construction, indexing device 33, FIG. 12, may include a threaded shaft 80 journaled in housing 16 which engages with a threaded stop nut 82. The stop carries with it arm 84 which has an aperture 86 for accommodating the end of sensor probe 22 and it mounts the base 88 of spring 28 whose forward end 90 grips sensor probe 22. By rotating shaft 80, stop nut 82 may be caused to traverse back and forth to the left and right in FIG. 12 along shaft 80, thereby moving the sensor probe forward or back with respect to housing 16, at the same time always providing the contact force of spring 28 to urge end 24 of sensor probe 22 into intimate contact with the end 26 of sensor well 12. In yet another construction, sensor probe 22 may be fixed directly to a leaf spring or other spring 100 which is attached to stop nut 82' and provides the same function as spring 28.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A variable length sensor probe system for connection to a sensor well, comprising:
   a housing adapted for connection to the proximate end of a sensor well;
   a sensor probe having a distal end extendable to the distal end of the sensor well and a proximate end extending into said housing; and
   an indexing device for interconnecting said housing and the proximate end of said sensor probe for setting the penetration of said sensor probe in the sensor well at one of a number of discrete positions and continuously urging the distal end of the sensor probe against the distal end of the sensor well.

2. The variable length sensor probe system of claim 1 in which said indexing device includes a bias member.

3. The variable length sensor probe system of claim 2 in which said bias member engages both said sensor probe and said housing.

4. The variable length sensor probe system of claim 1 in which said indexing device includes a bias member and a mounting element.

5. The variable length sensor probe system of claim 4 in which said bias member engages said sensor probe and said mounting element engages said housing.

6. The variable length sensor probe system of claim 4 in which said bias member engages said housing and said mounting element engages said sensor probe.

7. The variable length sensor probe system of claim 2 in which said bias member is a leaf spring.

8. The variable length sensor probe system of claim 2 in which said bias member is an elastomer.

9. The variable length sensor probe system of claim 2 in which said bias member is a coil spring.

10. The variable length sensor probe system of claim 1 in which said indexing device includes a number of aligned steps on said housing.

11. The variable length sensor probe system of claim 10 in which said indexing device includes a stop member for selectively engaging said steps.

12. The variable length sensor probe system of claim 1 in which said sensor probe includes at least one temperature sensing device.

13. The variable length sensor probe system of claim 1 in which said indexing device includes a threaded shaft and a threaded member engaged with said shaft.

14. The variable length sensor probe system of claim 13 in which said threaded member includes a biasing device.

15. The variable length sensor probe system of claim 13 in which said shaft engages said housing and said threaded member engages said sensor probe.

16. The variable length sensor probe system of claim 14 in which said shaft engages said housing and said biasing device engages said sensor probe.

17. The variable length sensor probe system of claim 1 in which said indexing device includes a plurality of steps on said sensor probe, a mounting element engaged with said housing and means for selectively interconnecting one of said steps and said housing.

* * * * *